US011438424B2

United States Patent
Iyer et al.

(10) Patent No.: US 11,438,424 B2
(45) Date of Patent: Sep. 6, 2022

(54) SCALED COMPUTE MANAGEMENT FOR COLLABORATION SOLUTIONS

(71) Applicant: Dell Products L.P., Hopkinton, MA (US)

(72) Inventors: Vivek Viswanathan Iyer, Austin, TX (US); Loo Shing Tan, Singapore (SG)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 17/154,400

(22) Filed: Jan. 21, 2021

(65) Prior Publication Data
US 2022/0232082 A1 Jul. 21, 2022

(51) Int. Cl.
| G06F 15/16 | (2006.01) |
| H04L 67/142 | (2022.01) |
| H04L 67/143 | (2022.01) |
| H04L 67/104 | (2022.01) |
| H04L 65/401 | (2022.01) |
| H04L 65/1083 | (2022.01) |

(52) U.S. Cl.
CPC ........ H04L 67/142 (2013.01); H04L 65/1083 (2013.01); H04L 65/4015 (2013.01); H04L 67/104 (2013.01); H04L 67/143 (2013.01)

(58) Field of Classification Search
CPC ... H04L 67/142; H04L 67/143; H04L 67/104; H04L 65/1083; H04L 65/4015
USPC ................................. 709/202–203, 227–228
See application file for complete search history.

(56) References Cited

U.S. PATENT DOCUMENTS

| 8,924,304 B2* | 12/2014 | Devine | H04L 65/4076 705/51 |
| 10,616,369 B1* | 4/2020 | d'Andrea | H04L 65/1069 |
| 10,924,522 B1* | 2/2021 | Meybaum | H04L 65/4015 |
| 11,075,796 B2* | 7/2021 | Lee | H04W 60/00 |
| 2007/0106727 A1* | 5/2007 | Mainard | H04L 65/4038 709/205 |
| 2008/0028323 A1* | 1/2008 | Rosen | G06Q 10/10 715/752 |
| 2009/0138608 A1* | 5/2009 | Arroyo | H04L 67/141 709/228 |
| 2012/0265810 A1* | 10/2012 | Reid | H04L 65/4076 709/204 |
| 2013/0109313 A1* | 5/2013 | Kneckt | H04W 4/80 455/41.2 |
| 2014/0365920 A1* | 12/2014 | Daniels | H04L 51/046 715/753 |

* cited by examiner

Primary Examiner — Bharat Barot
(74) Attorney, Agent, or Firm — Chamberlain, Hrdlicka, White, Williams & Aughtry

(57) ABSTRACT

A method for scaling (or adaptively distributing) compute resource consuming responsibilities amongst multiple participants of any given collaboration solution session. Specifically, the disclosed method analyzes mesh networking pertinent state (or changes thereof), associated with the various participants, using multi-user constrained optimization to produce mesh network configurations (or adjustments thereto). A mesh network configuration, subsequently, outlines a set of adaptive compute operations, pertinent to the management of a given collaboration solution session, which may be optimally distributed across the various participants based on their current state and user-imposed resource or capability budgets (if any).

20 Claims, 4 Drawing Sheets

SCALED COMPUTE MANAGEMENT FOR COLLABORATION SOLUTIONS

BACKGROUND

For any given collaboration session amongst devices (and the users thereof), there exists a session initiator and at least one session peer. Collectively, these entities work to distribute collaboration session tasks, workloads, resources, and other responsibilities.

SUMMARY

In general, in one aspect, the invention relates to a method for collaboration session management. The method includes collecting, by a session initiator of a collaboration session, local mesh-pertinent state associated with the session initiator, transmitting a probe request to a set of session peers of the collaboration session, receiving, in response to the probe request, remote mesh-pertinent state associated with and from each session peer of the set of session peers, obtaining, through multi-user constrained optimization, an initial mesh configuration based on at least a portion of the local mesh-pertinent state and at least a portion of the remote mesh-pertinent state, and deploying, based on a relevancy to the session initiator, at least a portion of the initial mesh configuration.

In general, in one aspect, the invention relates to a non-transitory computer readable medium (CRM). The non-transitory CRM includes computer readable program code, which when executed by a computer processor, enables the computer processor to perform a method for collaboration session management. The method includes collecting, by a session initiator of a collaboration session, local mesh-pertinent state associated with the session initiator, transmitting a probe request to a set of session peers of the collaboration session, receiving, in response to the probe request, remote mesh-pertinent state associated with and from each session peer of the set of session peers, obtaining, through multi-user constrained optimization, an initial mesh configuration based on at least a portion of the local mesh-pertinent state and at least a portion of the remote mesh-pertinent state, and deploying, based on a relevancy to the session initiator, at least a portion of the initial mesh configuration.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method for scaling (or adaptively distributing) compute resource consuming responsibilities amongst multiple participants of any given collaboration solution session. Specifically, the disclosed method analyzes mesh networking pertinent state (or changes thereof), associated with the various participants, using multi-user constrained optimization to produce mesh network configurations (or adjustments thereto). A mesh network configuration, subsequently, outlines a set of adaptive compute operations, pertinent to the management of a given collaboration solution session, which may be optimally distributed across the various participants based on their current state and user-imposed resource or capability budgets (if any).

Figure 1:
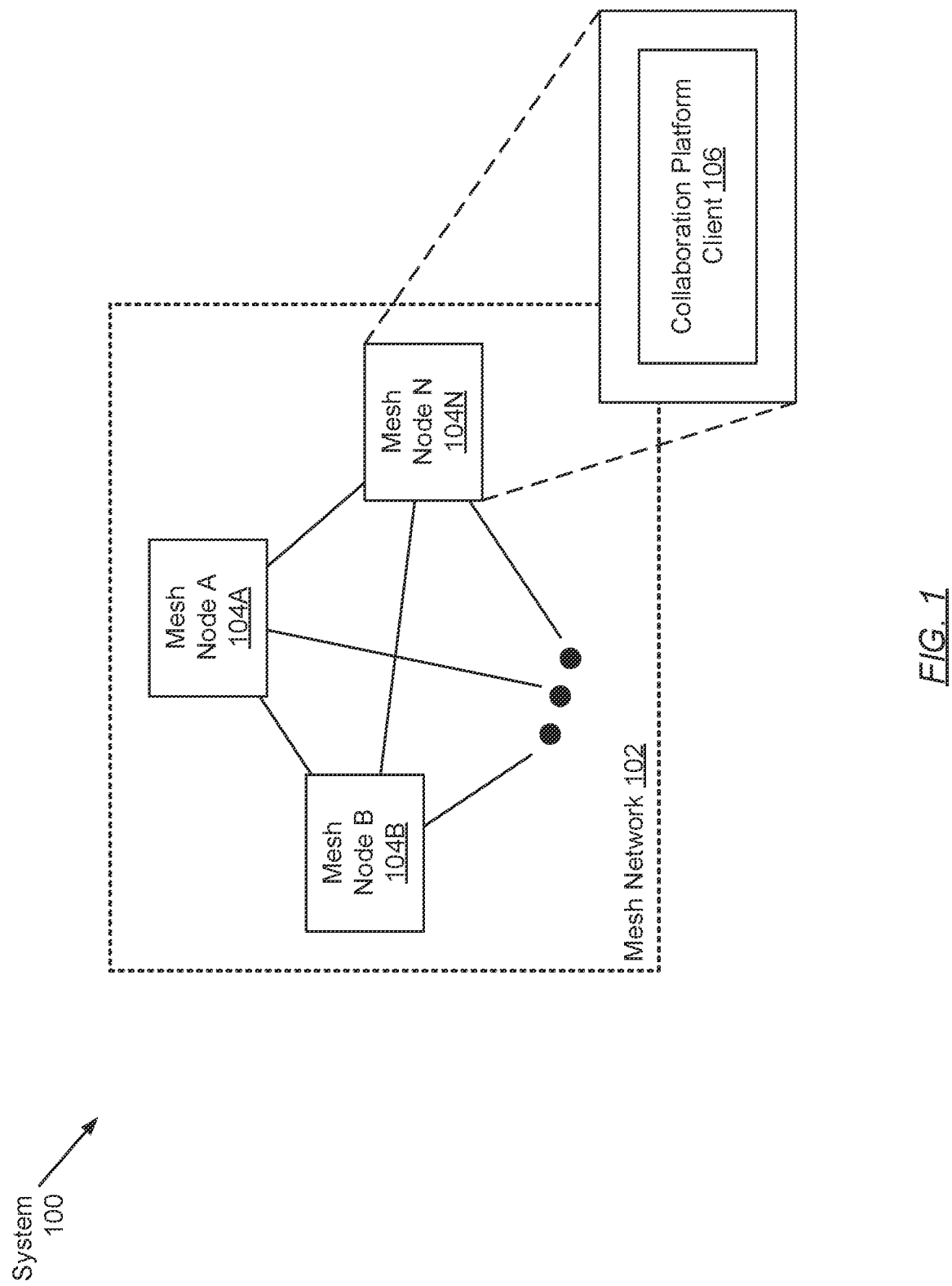
FIG. 1 shows a system in accordance with one or more embodiments of the invention.

FIG. 1 shows a system in accordance with one or more embodiments of the invention. The system (100) may include two or more interconnected mesh nodes (104A-104N), which may be described below.

In one embodiment of the invention, a mesh node (104A-104N) may represent any physical appliance or computing system configured to receive, generate, process, and/or transmit data, as well as to provide an environment in which at least a collaboration platform client (106) (described below) may operate thereon. In providing the aforementioned environment, a mesh node (104A-104N) may include and allocate various resources (e.g., computer processors, memory, storage, virtualization, networking, etc.), as needed, for at least the collaboration platform client (106) thereon to consume. One of ordinary skill will appreciate that a mesh node (104A-104N) may support other software and/or firmware, and may perform other functionalities without departing from the scope of the invention. Examples of a mesh node (104A-104N) may include, but are not limited to, a desktop computer, a laptop computer, a tablet computer, a smartphone, an intelligent or interactive display, a smart television, or any other computing system similar to the exemplary computing system shown in FIG. 4.

In one embodiment of the invention, each mesh node (104A-104N) may connect directly or indirectly (i.e., via a switch, a router, or any other network device (not shown)) to every other mesh node (104A-104N), thereby forming a mesh network (102). The mesh network (102) may therefore refer to a dynamic and non-hierarchical (or decentralized) network topology, where the mesh nodes (104A-104N) may include functionality to self-organize and self-configure. In this mesh network (102) formation, tasks and/or workloads may be distributed across the constituent mesh nodes (104A-104N).

In one embodiment of the invention, a collaboration platform client (106) may refer to software, firmware, or a combination thereof, which enables features and functionalities of a collaboration platform to execute or operate on the underlying hardware of any mesh node (104A-104N). The aforementioned collaboration platform may entail any service or tool (also referred to as groupware) that facilitates team or group collaboration—examples of which may include, but are not limited to, voice over Internet Protocol (VoIP) services, video-conferencing services, document sharing services, messaging services, email services, group calendar services, or any combination thereof. Further, each collaboration platform client (106) (respectively on each mesh node (104A-104N)) may include functionality to communicate, and thus exercise peer-to-peer (P2P) networking, with every other collaboration platform client (106) (respectively on every other mesh node (104A-104N)). One of ordinary skill will appreciate that any collaboration platform client (106) may perform other functionalities without departing from the scope of the invention.

In one embodiment of the invention, for any given collaboration session, one of the collaboration platform clients (106) (or one of the mesh nodes (104A-104N)) may take on the role of the session initiator, whereas the remaining collaboration platform clients (106) (or the remaining mesh nodes (104A-104N)) may each take on the role of a session peer. The session initiator may refer to the entity responsible for creating, hosting, or initializing the given collaboration session and, accordingly, may at least perform the method outlined in FIG. 2, below, which is directed to scaled compute resources management. Further, the session initiator may embody (or operate on) a private device—i.e., a physical computing device (e.g., desktop computer, laptop computer, tablet computer, smartphone, etc.) belonging to and operated by an individual user. On the other hand, a session peer may refer to an entity selected or invited, by the session initiator, to join and participate in the given collaboration session. To that extent, each session peer may at least perform the method outlined in FIG. 3, below, which is directed to scaled compute resources management. A session peer may embody (or operate on) another private device (described above) or may alternatively embody (or operate on) a public device—i.e., a physical computing device (e.g., intelligent/interactive display, smart television, etc.) available for community use. One of ordinary skill will appreciate that the session initiator and each session peer may perform other functionalities without departing from the scope of the invention.

In one embodiment of the invention, the above-mentioned system (100) components may communicate with one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention. For example, in one or more embodiments of the invention, the system (100) may further include a collaboration platform service (not shown) to which the mesh network (102) may operatively connect. The collaboration platform service may represent information technology (IT) infrastructure configured to provide collaboration platform back-end support (e.g., offloading of one or more collaboration session tasks, workloads, and/or other responsibilities, multi-user constrained optimization processing, etc.). Further, the collaboration platform service may be implemented using one or more servers. Each server may represent a physical or virtual server, which may reside in a data center or cloud computing environment. Additionally, or alternatively, the collaboration platform service may be implemented using one or more computing systems similar to the exemplary computing system shown in FIG. 4.

Figure 2:
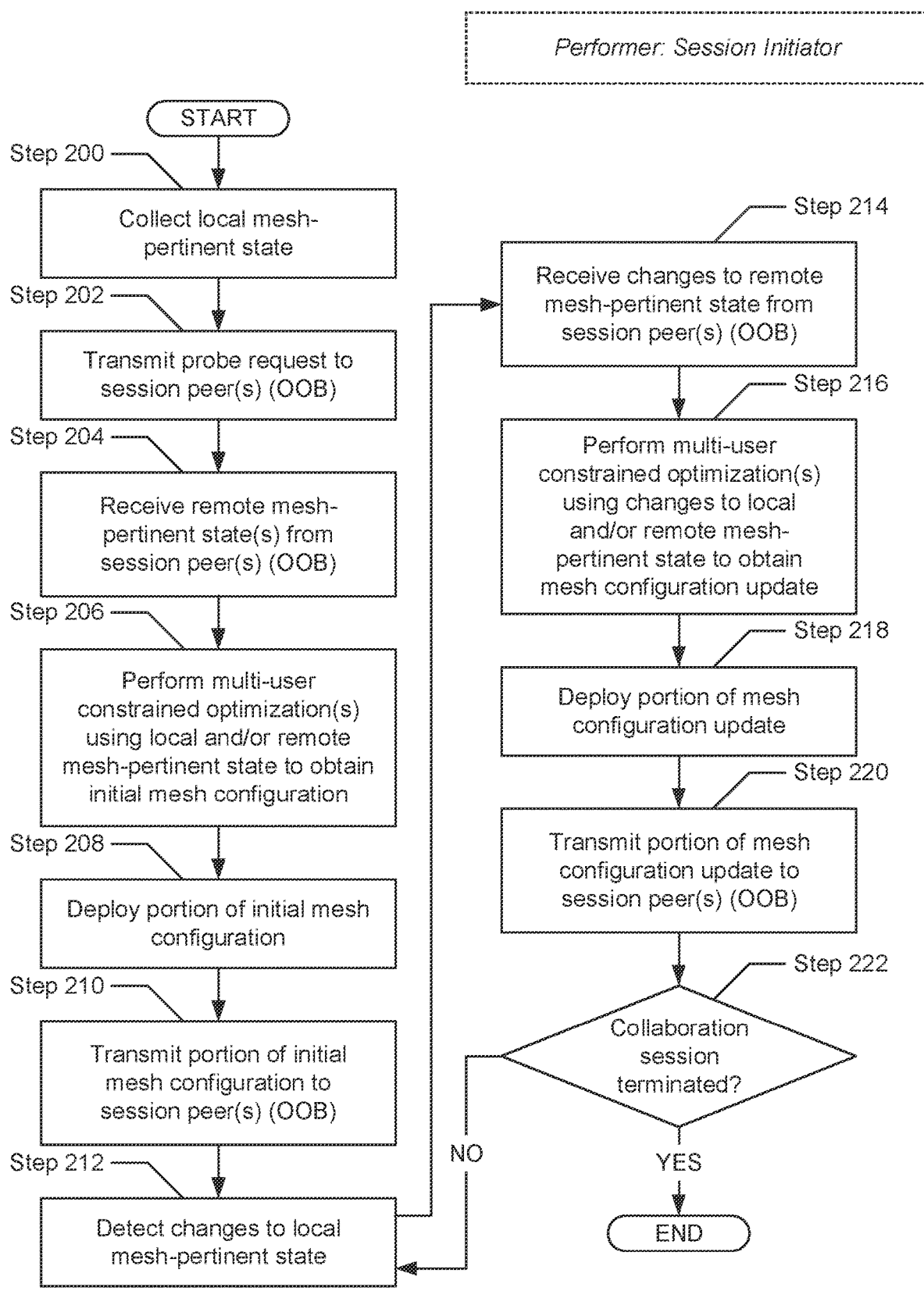
FIG. 2 shows a flowchart describing a method for scaled compute management in accordance with one or more embodiments of the invention.

FIG. 2 shows a flowchart describing a method for scaled compute management in accordance with one or more embodiments of the invention. The various steps outlined below may be performed by a session initiator (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, local mesh-pertinent state is collected. In one embodiment of the invention, local mesh-pertinent state may refer to information describing the current condition, circumstances, and/or capabilities of the session initiator, which may influence the mesh network configuration and/or operations. Examples of local mesh-pertinent state may include, but are not limited to, current device resource (e.g., compute, storage, virtualization, networking, etc.) utilization metrics (as well as device resource constraints or budgetary allocation considerations), current user status (e.g., present/available or exited/unavailable), current device capabilities (e.g., networking adaptor specs, sensor(s) specs, computer processor(s) specs, storage specs, task and/or workload offloading, etc.), and current device connectivity status (e.g., details on connection(s) to other mesh node(s) or other device(s) outside mesh network, collaboration session(s) parameters, etc.).

In Step 202, a probe request is transmitted to one or more session peers. In one embodiment of the invention, the probe request may be used to seek remote mesh-pertinent state (described below) from each of the session peer(s). Further, transmission of the probe request may employ out-of-band (OOB) or in-band communication channels.

In Step 204, in response to the probe request(s) (transmitted in Step 202), remote mesh-pertinent state is received from the session peer(s). In one embodiment of the invention, for any given session peer, the remote mesh-pertinent state may refer to information describing the current condition, circumstances, and/or capabilities of the given session peer, which may influence the mesh network configuration and/or operations. Examples of remote mesh-pertinent state may include, but are not limited to, current device resource (e.g., compute, storage, virtualization, networking, etc.) utilization metrics (as well as device resource constraints or budgetary allocation considerations), current user status (e.g., present/available or exited/unavailable), current device capabilities (e.g., networking adaptor specs, sensor(s) specs, computer processor(s) specs, storage specs, task and/or workload offloading, etc.), and current device connectivity status (e.g., details on connection(s) to other mesh node(s) or other device(s) outside mesh network, collaboration session(s) parameters, etc.). Further, like the probe request(s), receipt of any remote mesh-pertinent state, from the session peer(s), may employ OOB or in-band communication channels.

In Step 206, using the local mesh-pertinent state (collected in Step 200) (or any portion thereof) and/or the remote mesh-pertinent state (received in Step 204) (or any portion thereof), one or more multi-user constrained optimizations is/are performed. In one embodiment of the invention, a multi-user constrained optimization may refer to the resolution of a problem defined by a set of users or entities (e.g., mesh nodes) and a minimizing or maximizing objective function (e.g., cost function, energy function, reward function, utility function, etc.) sought to be optimized with respect to one or more variables (e.g., local/remote mesh-pertinent state) in view of constraint(s) imposed on the aforementioned variable(s).

In one embodiment of the invention, the above-mentioned problem may be directed to any collaboration session relevant task, workload, or other responsibility, which consumes compute resources (e.g., computer processor cycles, memory space, etc.) and can be distributed amongst the collaboration session entities—e.g., the session initiator and the one or more session peers. Examples of these compute-consuming tasks, workloads, and/or other responsibilities may include, but are not limited to: participant (or mesh node) entry and/or exit monitoring using session peer discovery; video decoding and/or encoding (or the associated offload usage thereof); audio noise cancellation (or the associated offload usage thereof); collaboration session recording; intelligent speech-to-text transcribing; screen sharing and/or casting (or the associated offload usage thereof); and the performance of background processes (e.g., virtual background generation, face smoothing, eye contact correction, active speaker identification and switching, etc.). Collectively, these collaboration session tasks, workloads, and/or other responsibilities may also be referred to hereinafter as adaptive compute operations.

By way of a simple, non-limiting example, consider the problem directed to participant entry and/or exit monitoring using session peer discovery amongst the various collaboration session entities for a given collaboration session. Specifically, it can be assumed that the activity of session peer discovery, for any given collaboration session entity, may at least require usage of respectively available compute (e.g., central processing unit) and wireless networking (e.g., network adapter, network interface card, etc.) resources. In turn, the aforementioned resources may each require electrical power to function, and thus, facilitate session peer discovery. Given these assumptions, it would be inefficient to permit each collaboration session entity to continuously engage in session peer discovery, at the expense of runaway compute cycles and electrical power consumption. Multi-user constrained optimization, accordingly, may be used here to ascertain how often (or the optimal maximum frequency) $F(n)$ that each mesh node $n=1, 2, \ldots, N$ (i.e., number of mesh nodes) should perform session peer discovery, such that: (a) a compute metric $C(n)$ (e.g., CPU utilization percentage) per mesh node is always under a compute metric limit $Cmax(n)$ allocated for/by the mesh node; and (b) a total consumption of electrical power $\Sigma P(n)$ across all collaboration session entities is minimized.

Further, in one embodiment of the invention, performance of the above-mentioned multi-user constrained optimization(s) may result in the obtaining of an initial mesh configuration. The initial mesh configuration may outline an initial scheme through which one or more adaptive compute operations (described above) may be optimally distributed across the session initiator and the session peer(s), given the local and/or remote mesh-pertinent state provided at the given time. Moreover, in one embodiment of the invention, the above-mentioned multi-user constrained optimization(s) may be performed by and/or on the session initiator. Alternatively, in another embodiment of the invention, performance of the above-mentioned multi-user constrained optimization(s) may be delegated, by the session initiator, to a collaboration platform service (described above) (see e.g., FIG. 1).

In Step 208, at least a portion of the initial mesh configuration (obtained in Step 206)—relevant thereto—is deployed (or applied) by the session initiator. Subsequently, in Step 210, any portion(s) of the initial mesh configuration—relevant to one or more session peers—is/are transmitted to the session peer(s). In one embodiment of the invention, transmission of the initial mesh configuration portion(s) may employ OOB or in-band communication channels.

In Step 212, changes to local mesh-pertinent state (described above), associated with the session initiator, are detected and, thus, collected. Similarly, in Step 214, changes to remote mesh-pertinent state (described above), associated with one or more session peers, are received therefrom. Further, receipt of the aforementioned changes may employ OOB or in-band communication channels.

In Step 216, using the changes to local mesh-pertinent state (detected/collected in Step 212) (or any portion thereof) and/or the changes to remote mesh-pertinent state (received in Step 214) (or any portion thereof), one or more multi-user constrained optimizations (described above) is/are performed.

Further, in one embodiment of the invention, performance of the aforementioned multi-user constrained optimization(s) may result in the obtaining of a mesh configuration update. The mesh configuration update may outline adjustments to any existing scheme through which one or more adaptive compute operations (described above) may be optimally distributed across the session initiator and the session peer(s), given the local and/or remote mesh-pertinent state (or changes thereof) provided at the given time. Moreover, in one embodiment of the invention, the above-mentioned multi-user constrained optimization(s) may be performed by and/or on the session initiator. Alternatively, in another embodiment of the invention, performance of the above-mentioned multi-user constrained optimization(s) may be delegated, by the session initiator, to a collaboration platform service (described above) (see e.g., FIG. 1).

In Step 218, at least a portion of the mesh configuration update (obtained in Step 216)—relevant thereto—is deployed (or applied) by the session initiator. Subsequently, in Step 220, any portion(s) of the mesh configuration update—relevant to one or more session peers—is transmitted to the session peer(s). In one embodiment of the invention, transmission of the mesh configuration update portion(s) may employ OOB or in-band communication channels.

In Step 222, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 212, where a next iteration of changes to local mesh-pertinent state, associated with the session initiator, may be detected/collected.

Figure 3:
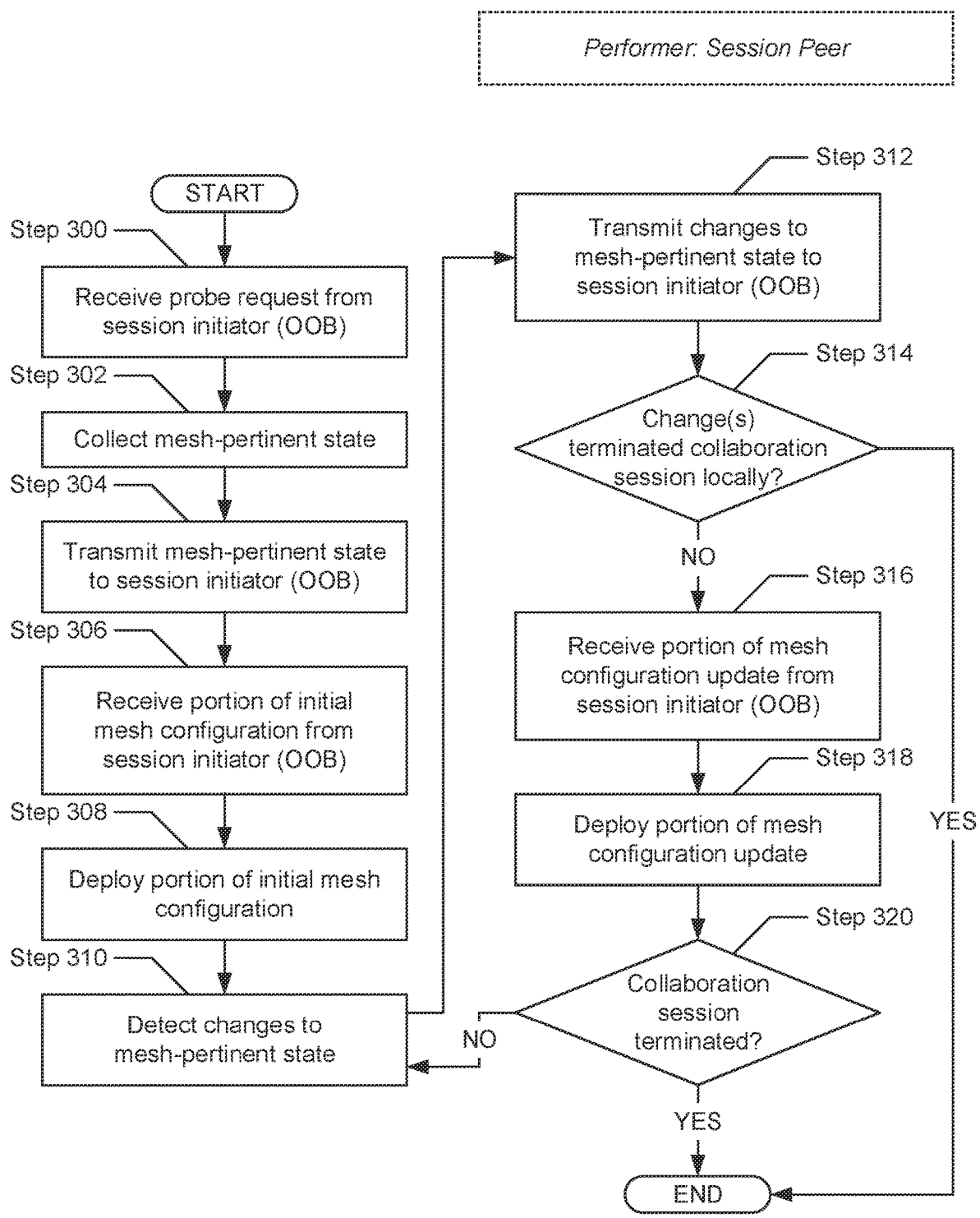
FIG. 3 shows a flowchart describing a method for scaled compute management in accordance with one or more embodiments of the invention.

FIG. 3 shows a flowchart describing a method for scaled compute management in accordance with one or more embodiments of the invention. The various steps outlined below may be performed by any session peer (described above) (see e.g., FIG. 1). Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, a probe request is received from a session initiator of a collaboration session. In one embodiment of the invention, the probe request may seek mesh-pertinent state from the session peer. Further, receipt of the probe request may employ out-of-band (OOB) or in-band communication channels.

In Step 302, in response to the probe request (received in Step 300), mesh-pertinent state, associated with the session peer, is collected. In one embodiment of the invention, the mesh-pertinent state may refer to information describing the current condition, circumstances, and/or capabilities of the session peer, which may influence the mesh network configuration and/or operations. Examples of mesh-pertinent state may include, but are not limited to, current device resource (e.g., compute, storage, virtualization, networking, etc.) utilization metrics (as well as device resource constraints or budgetary allocation considerations), current user status (e.g., present/available or exited/unavailable), current device capabilities (e.g., networking adaptor specs, sensor(s) specs, computer processor(s) specs, storage specs, task and/or workload offloading, etc.), and current device connectivity status (e.g., details on connection(s) to other mesh node(s) or other device(s) outside mesh network, collaboration session(s) parameters, etc.).

In Step 304, the mesh-pertinent state (collected in Step 302) is transmitted to the session initiator. In one embodiment of the invention, transmission of the mesh-pertinent state may employ OOB or in-band communication channels. Thereafter, in Step 306, an initial mesh configuration (or at least a relevant portion thereof) is received from the session initiator. In one embodiment of the invention, the initial mesh configuration may outline an initial scheme through which one or more adaptive compute operations (described above) (see e.g., FIG. 2) may be optimally distributed across the session initiator and the session peer(s), given the local and/or remote mesh-pertinent state provided at the given time.

In Step 308, the initial mesh configuration portion (received in Step 306) is subsequently deployed (or applied) by the session peer. Subsequently, in Step 310, one or more changes to the mesh-pertinent state (described above), associated with the session peer, is/are detected, and thus, collected. In Step 312, the change(s) to the mesh-pertinent state (detected in Step 310) is/are transmitted to the session initiator. In one embodiment of the invention, the aforementioned transmission may employ OOB or in-band communication channels.

In Step 314, a determination is made as to whether the change(s) to the mesh-pertinent state (detected in Step 310) at least include (or lead to) a termination of the collaboration session locally—e.g., exiting of the session peer user from the collaboration session. In one embodiment of the invention, if it is determined that the change(s) do indeed include (or lead to) the termination of the collaboration session on or by the session peer, then the process ends. On the other hand, in another embodiment of the invention, if it is alternatively determined that the change(s) exclude (or will not lead to) the termination of the collaboration session locally, then the process proceeds to Step 316.

In Step 316, in response to the transmission of the change(s) to the mesh-pertinent state (in Step 312), a mesh configuration update (or at least a relevant portion thereof) is received from the session initiator. In one embodiment of the invention, the mesh configuration update may outline adjustments to any existing scheme through which one or more adaptive compute operations (described above) (see e.g., FIG. 2) may be optimally distributed across the session initiator and the session peer(s), given the local and/or remote mesh-pertinent state (or changes thereof) provided at the given time. Further, receipt of the mesh configuration update portion may employ OOB or in-band communication channels. Thereafter, in Step 318, the mesh configuration update portion (received in Step 316) is subsequently deployed (or applied) by the session peer.

In Step 320, a determination is made as to whether the collaboration session has been terminated. In one embodiment of the invention, if it is determined that the collaboration session has been terminated, then the process ends. On the other hand, in another embodiment of the invention, if it is alternatively determined that the collaboration session is not yet terminated, then the process proceeds to Step 310, where a next iteration of changes to the mesh-pertinent state, associated with the session peer, may be detected/collected.

Figure 4:
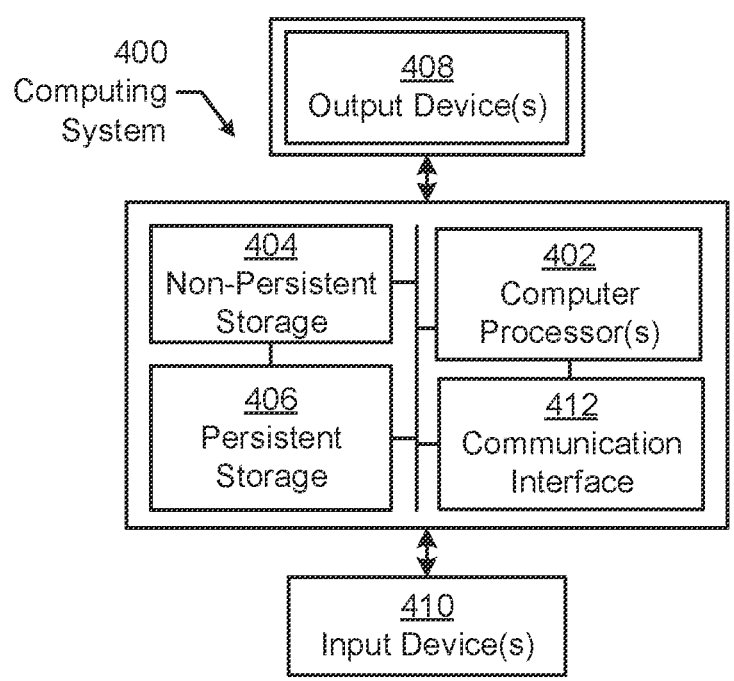
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for collaboration session management, comprising:
    collecting, by a session initiator of a collaboration session, local mesh-pertinent state associated with the session initiator;
    transmitting a probe request to a set of session peers of the collaboration session;
    receiving, in response to the probe request, remote mesh-pertinent state associated with and from each session peer of the set of session peers;
    obtaining, through multi-user constrained optimization, an initial mesh configuration based on at least a portion of the local mesh-pertinent state and at least a portion of the remote mesh-pertinent state; and
    deploying, based on a relevancy to the session initiator, at least a portion of the initial mesh configuration.

2. The method of claim 1, wherein the local mesh-pertinent state comprises a set of current device resource utilization metrics, a current user status, a set of current device capabilities, and a current device connectivity status.

3. The method of claim 1, wherein the initial mesh configuration outlines a scheme through which at least one adaptive compute operation pertinent to a management of the collaboration session is optimally distributed across the session initiator and the set of session peers.

4. The method of claim 3, wherein the at least one adaptive compute operation comprises at least one selected from a group consisting of participant entry and exit monitoring using session peer discovery, video encoding and decoding, collaboration session recording, audio noise cancellation, intelligent speech-to-text transcribing, screen sharing and casting, and adaptive computer operation offloading to a collaboration platform service.

5. The method of claim 1, wherein transmission of the probe request and receiving of the remote mesh-pertinent state employ one selected from a group consisting of an in-band communication channel and an out-of-band (OOB) communication channel.

6. The method of claim 1, wherein the multi-user constrained optimization is performed by one selected from a group consisting of the session initiator and a collaboration platform service.

7. The method of claim 1, further comprising:
    transmitting, by the session initiator, the initial mesh configuration to each session peer of the set of session peers,
    wherein each session peer deploys, based on a relevancy thereto, at least another portion of the initial mesh configuration.

8. The method of claim 7, further comprising:
    performing, by the session initiator and until the collaboration session terminates, an iterative process, comprising:
        detecting at least one change to the local mesh-pertinent state associated with the session initiator;
        obtaining, through another multi-user constrained optimization, a mesh configuration update at least based on the at least one change to the local mesh-pertinent state;
        deploying, based on the relevancy to the session initiator, at least a portion of the mesh configuration update; and
        transmitting the mesh configuration update to each session peer of the set of session peers,
        wherein each session peer deploys, based on the relevancy thereto, at least another portion of the mesh configuration update.

9. The method of claim 8, further comprising:
    prior to obtaining the mesh configuration update:
        receiving, from at least one session peer of the set of session peers, at least one change to the remote mesh-pertinent state associated with the at least one session peer,
        wherein the mesh configuration update is obtained, through the other multi-user constrained optimization, further based on the at least one change to the remote mesh-pertinent state.

10. The method of claim 7, further comprising:
    performing, by the session initiator and until the collaboration session terminates, an iterative process, comprising:
        receiving, from at least one session peer of the set of session peers, at least one change to the remote mesh-pertinent state associated with the at least one session peer;
        obtaining, through another multi-user constrained optimization, a mesh configuration update based on the at least portion of the remote mesh-pertinent state;
        deploying, based on the relevancy to the session initiator, at least a portion of the mesh configuration update; and
        transmitting the mesh configuration update to each session peer of the set of session peers,
        wherein each session peer deploys, based on the relevancy thereto, at least another portion of the mesh configuration update.

11. A non-transitory computer readable medium (CRM) comprising computer readable program code, which when executed by a computer processor, enables the computer processor to perform a method for collaboration session management, the method comprising:

collecting, by a session initiator of a collaboration session, local mesh-pertinent state associated with the session initiator;

transmitting a probe request to a set of session peers of the collaboration session;

receiving, in response to the probe request, remote mesh-pertinent state associated with and from each session peer of the set of session peers;

obtaining, through multi-user constrained optimization, an initial mesh configuration based on at least a portion of the local mesh-pertinent state and at least a portion of the remote mesh-pertinent state; and deploying, based on a relevancy to the session initiator, at least a portion of the initial mesh configuration.

12. The non-transitory CRM of claim 11, wherein the local mesh-pertinent state comprises a set of current device resource utilization metrics, a current user status, a set of current device capabilities, and a current device connectivity status.

13. The non-transitory CRM of claim 11, wherein the initial mesh configuration outlines a scheme through which at least one adaptive compute operation pertinent to a management of the collaboration session is optimally distributed across the session initiator and the set of session peers.

14. The non-transitory CRM of claim 13, wherein the at least one adaptive compute operation comprises at least one selected from a group consisting of participant entry and exit monitoring using session peer discovery, video encoding and decoding, collaboration session recording, audio noise cancellation, intelligent speech-to-text transcribing, screen sharing and casting, and adaptive computer operation off-loading to a collaboration platform service.

15. The non-transitory CRM of claim 11, wherein transmission of the probe request and receiving of the remote mesh-pertinent state employ one selected from a group consisting of an in-band communication channel and an out-of-band (OOB) communication channel.

16. The non-transitory CRM of claim 11, wherein the multi-user constrained optimization is performed by one selected from a group consisting of the session initiator and a collaboration platform service.

17. The non-transitory CRM of claim 11, wherein the method further comprises:

transmitting, by the session initiator, the initial mesh configuration to each session peer of the set of session peers, wherein each session peer deploys, based on a relevancy thereto, at least another portion of the initial mesh configuration.

18. The non-transitory CRM of claim 17, wherein the method further comprises:

performing, by the session initiator and until the collaboration session terminates, an iterative process, comprising:

detecting at least one change to the local mesh-pertinent state associated with the session initiator;

obtaining, through another multi-user constrained optimization, a mesh configuration update at least based on the at least one change to the local mesh-pertinent state;

deploying, based on the relevancy to the session initiator, at least a portion of the mesh configuration update; and transmitting the mesh configuration update to each session peer of the set of session peers, wherein each session peer deploys, based on the relevancy thereto, at least another portion of the mesh configuration update.

19. The non-transitory CRM of claim 18, wherein the method further comprises:

prior to obtaining the mesh configuration update:

receiving, from at least one session peer of the set of session peers, at least one change to the remote mesh-pertinent state associated with the at least one session peer, wherein the mesh configuration update is obtained, through the other multi-user constrained optimization, further based on the at least one change to the remote mesh-pertinent state.

20. The non-transitory CRM of claim 17, wherein the method further comprises:

performing, by the session initiator and until the collaboration session terminates, an iterative process, comprising:

receiving, from at least one session peer of the set of session peers, at least one change to the remote mesh-pertinent state associated with the at least one session peer;

obtaining, through another multi-user constrained optimization, a mesh configuration update based on the at least portion of the remote mesh-pertinent state;

deploying, based on the relevancy to the session initiator, at least a portion of the mesh configuration update; and transmitting the mesh configuration update to each session peer of the set of session peers, wherein each session peer deploys, based on the relevancy thereto, at least another portion of the mesh configuration update.

* * * * *